US012792408B2

(12) United States Patent
Manevich et al.

(10) Patent No.: US 12,792,408 B2
(45) Date of Patent: Nov. 10, 2026

(54) SCHEDULING WORKLOAD SYNCHRONIZATION BASED ON REAL-TIME LATENCY MEASUREMENTS

(71) Applicant: Mellanox Technologies, Ltd., Yokneam Illit (IL)

(72) Inventors: Natan Manevich, Migdal HaEmek (IL); Dotan David Levi, Kiryat Motzkin (IL); Wojciech Wasko, Mlynek (PL); Shay Aisman, Zichron Yaacov (IL); Ariel Almog, Kochav Yair (IL); Eliel Peretz, Kiryat Motzkin (IL); Igor Voks, Kfar Yehoshua (IL)

(73) Assignee: Mellanox Technologies, Ltd., Yokneam Illit (IL)

( * ) Notice: Subject to any disclaimer, the term of this patent is extended or adjusted under 35 U.S.C. 154(b) by 710 days.

(21) Appl. No.: 18/110,788

(22) Filed: Feb. 16, 2023

(65) Prior Publication Data

US 2024/0281292 A1 Aug. 22, 2024

(51) Int. Cl.
*G06F 9/50* (2006.01)

(52) U.S. Cl.
CPC ............ *G06F 9/5038* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 11,188,437 | B1 * | 11/2021 | Arunachalam | G06F 9/4806 |
| 2018/0309565 | A1 * | 10/2018 | Paterson | H04L 43/0852 |
| 2021/0037113 | A1 * | 2/2021 | Wang | G06F 9/5022 |
| 2022/0061059 | A1 * | 2/2022 | Dunsmore | H04L 9/0897 |
| 2022/0318040 | A1 * | 10/2022 | White | G06F 13/28 |

* cited by examiner

*Primary Examiner* — Eric C Wai
(74) *Attorney, Agent, or Firm* — Lowenstein Sandler LLP

(57) ABSTRACT

A device includes a transceiver coupled to a processing device. The processing device is to determine a first time for executing an operation associated with a work execution agent of a plurality of work execution agent. The processing device is further to receive a latency measurement associated with the work execution agent responsive to transmitting the request. The latency measurement is calculated after executing a previous operation associated with the work execution agent at the device. The processing device is also to modify the first time to a second time for executing the operation responsive to receiving the latency measurement.

18 Claims, 9 Drawing Sheets

200

SCHEDULING WORKLOAD SYNCHRONIZATION BASED ON REAL-TIME LATENCY MEASUREMENTS

TECHNICAL FIELD

At least one embodiment pertains to processing resources used to perform and facilitate high-speed communications. For example, at least one embodiment pertains to technology for scheduling workload synchronization based on real-time latency measurements. For example, at least one embodiment relates to executing a workload based on determining a real-time latency of a system.

BACKGROUND

In communication systems, a software component (e.g., a set of instructions used to operate a device of the system) can transmit workload requests to a hardware component (e.g., a transmitter). For example, the software component can use an interface to place the workload requests in a queue that the hardware component can access. The workload requests can be requests for data to be transmitted via a wire coupled to a device of the communication system. In some communication systems, the data is to be transmitted at a specific time—e.g., the data transmission is to be synchronized with a time. For example, telecommunication systems (e.g., in a fifth-generation telecommunication network (5G)) and media streaming applications can require strict and demanding network traffic patterns and need data to be transmitted synchronized to a real-world time. Some communication systems can attempt to transmit packets at a specific time by having the software component post (e.g., transmit) the workload request to the queue when the specific time arrives. However, due to processing times and latencies, the actual packet can be sent several microseconds after the specific time. Some communication systems can attempt to transmit packets at a specific time by enabling the software component to add a specific time to a workload descriptor posted to the queue—e.g., the specific time indicating when the hardware component should start processing and transmitting the data associated with the workload. In either communication system, there can be inaccuracies due to different latencies, which can be added after the moment of scheduling but before the workload is executed or transmitted. Accordingly, the communication systems can fail to synchronize their workload requests.

BRIEF DESCRIPTION OF DRAWINGS

Various embodiments in accordance with the present disclosure will be described with reference to the drawings, in which.

DETAILED DESCRIPTION

Figure 1A:
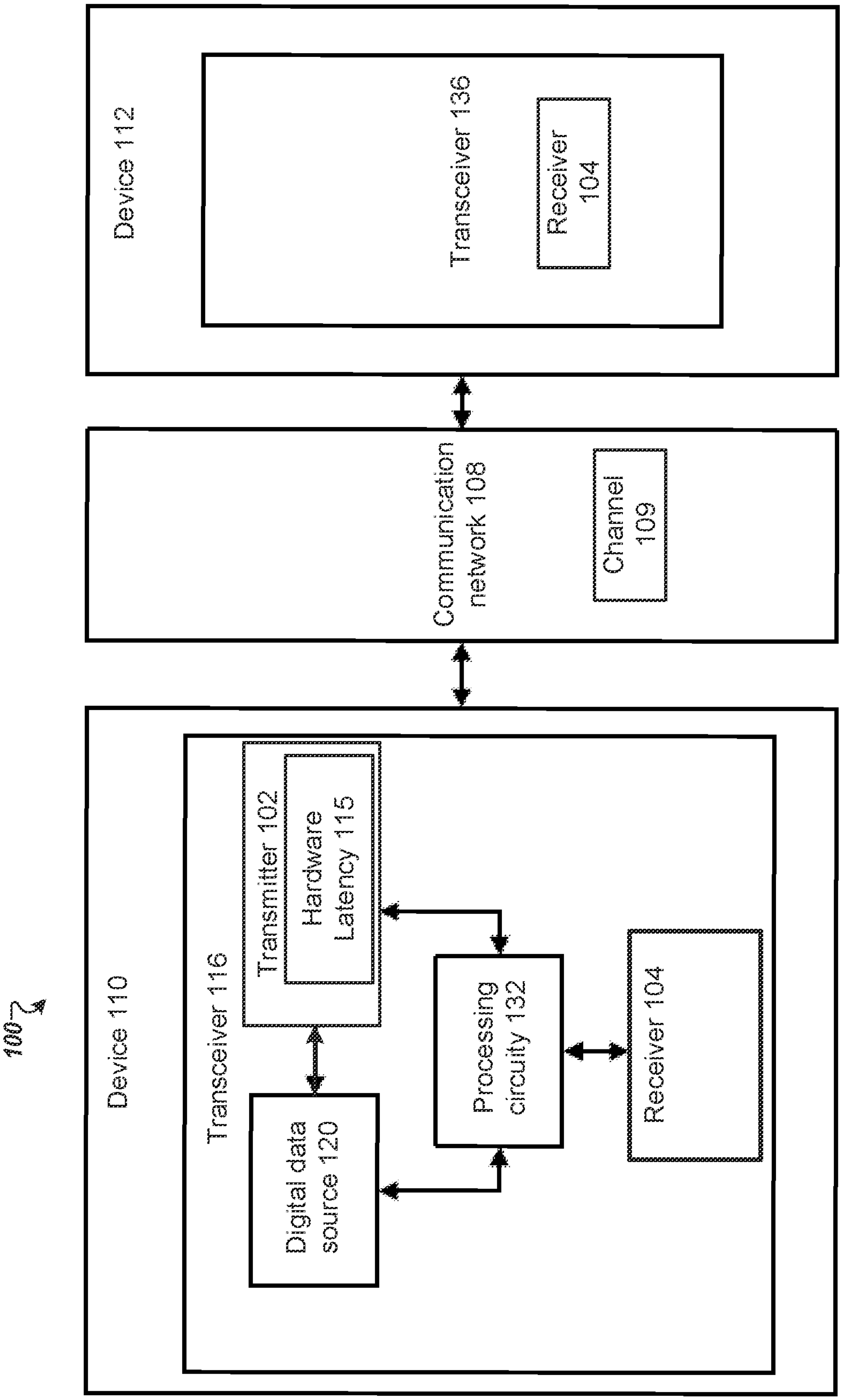
FIG. 1A is an example communication system, in accordance with at least some embodiments.

As described above, some systems (e.g., communication systems) require synchronization of workload requests—e.g., systems need to execute (e.g., consume) a workload at a specific time. For example, in communication systems, devices can transmit data packets at a specific time or synchronized with a real-world time. For example, telecommunication systems (e.g., in a fifth-generation telecommunication network (5G)) and media streaming applications can require strict and demanding network traffic patterns and need data to be transmitted synchronized to a real-world time. Some communication systems can attempt to transmit packets at a specific time by having a software component (e.g., a set of instructions or programs operating a device of the communication system) post (e.g., transmit) the workload request to a queue (e.g., an interface coupling the software component with a hardware component) when the specific time arrives. However, a hardware component (e.g., transmitter) can take some time to process the request, and there can be additional latencies as well. Accordingly, it can be difficult for the software component to post the workload in the queue at a "specific or right" time due to the latencies and processing time. Some communication systems can attempt to transmit packets at a specific time by enabling the software component to add a specific time to a workload descriptor that is posted to the queue—e.g., the specific time indicating a time the hardware component should start processing and transmitting the data associated with the workload. However, there can be different latencies that can be added after the moment of scheduling but before the workload is executed that cause inaccuracies.

For example, the software component can attempt to have two (2) queues transmit a single packet each at the same time. If the two (2) queues are located or associated with different memory regions, there can be different latencies. For example, the first queue can be associated with a first memory region (e.g., a central processing unit (CPU)), and the second queue can be associated with a second memory region (e.g., a general processing unit (GPU)). In some examples, a link coupling the first memory region and second memory region to a network device (e.g., a device configured to transmit the data) can have a different latency associated with transmitting data from the first memory region to the network device compared with transmitting data from the second memory region to the network device. Accordingly, even if the software component posts the workloads to the two (2) queues at a same time, one packet can be received by the network device earlier and accordingly, be transmitted earlier (e.g., not in synch with the other packet). Some solutions can attempt to have a software component assume a pre-defined latency to try to compensate for the latencies. However, the latencies are not constant and can change based on different use-cases, workload patterns, workload descriptors, queues, memory regions, etc. Accordingly, it can be difficult to synchronize workloads accurately.

Advantageously, aspects of the present disclosure can address the deficiencies above and other challenges by providing a system and a method for synchronizing workload requests based on real-time latency measurements. For example, a hardware component (e.g., transmitter or network device) can calculate and monitor latencies associated with processing and executing a workload—e.g., determine latencies associated with steps taken after a workload is posted to the queue and before the workload is executed or transmitted. In some embodiments, the hardware component can determine latencies associated with transmitting data from a memory region to the network device or a latency associated with processing and storing the data at a buffer of the network device. In some embodiments, the hardware component can monitor or determine latencies associated with each memory region, for different types of workload requests or descriptors (e.g., for a read operation vs. a write operation), for different applications (e.g., for media streaming versus telecommunications), etc. Additionally, the hardware component can determine average latencies, maximum latencies, minimum latencies, or other calculations to determine a latency value. In some embodiments, the hardware component can periodically determine the latencies described above—e.g., after each time a workload is requested or after a predetermined time. Accordingly, the hardware component can determine real-time latencies and generate a prediction of a future latency—e.g., predict a latency for a workload that is posted or to be posted to the queues.

In some embodiments, the software component, hardware component, or a combination of the hardware component and software component, can use the latency values calculated to synchronize workload requests. For example, the software component can poll the hardware component for a latency associated with a particular workload request. In such examples, the software component can use a response to the poll (e.g., use a received latency value) to post a work descriptor to the queue at a time T−L, where "T" is a specified time associated with executing (e.g., transmitting) data associated with the workload descriptor and "L" is the latency value received—e.g., the software component can cause the hardware component to begin processing the workload descriptor at a time T−L so that the workload can be executed at the time "T." In some embodiments, the software can request an average latency, a minimum latency, a maximum latency, etc., based on the workload request—e.g., the software component can use a minimum latency or maximum latency if the packet cannot be sent earlier than or later than a specified time.

In some embodiments, the software component can poll the hardware component for a latency associated with a particular workload request and then include the received latency in a workload descriptor. For example, the software component can modify a workload descriptor to include a time T−L. In such embodiments, a scheduler of the hardware can read the workload descriptor and initiate processing the workload descriptor at the time T−L.

In some embodiments, the hardware component can use the latency values calculated. For example, the software component can post a workload descriptor with a specified time "T" in a queue. The hardware component can read the workload descriptor and determine an average latency associated with the workload descriptor. Accordingly, the hardware component can modify a time of the workload descriptor based on the latency calculated—e.g., modify the workload descriptor to have a time T−L. In such examples, the hardware component can then process the workload request at the time T−L so that the workload is executed (e.g., transmitted) at the time T.

By utilizing the real-time latency value when scheduling workloads, the system can accurately synchronize workload requests. Additionally, the system can reduce buffer utilization as data and packets arrive at the buffer at a time "T" rather than before—e.g., the buffer does not receive packets before "T" and therefore, the buffer does not store data unnecessarily.

FIG. 1A illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals). In some embodiments, the communication network 108 can include one or more paths associated with transmitting data and one or more paths associated with transmitting a clock signal.

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104 of device 112. In at least one embodiment, the transmitter 102 can include hardware latency component 115. In some embodiments, the hardware latency component 115 is configured to calculate and monitor latencies associated with processing and executing a workload—e.g., determine a latency measurement associated with any step taken by the transceiver 116 after a workload is posted to a work queue of the device 110. In at least one embodiment, the hardware latency component 115 is configured to determine latency measurements associated with respective memory regions (e.g., for a central processing unit (CPU) or a graphics processing unit (GPU)), for different types of workload requests or descriptors, for different applications (e.g., for media streaming versus telecommunications), etc. In at least one embodiment, the hardware latency component 115 is configured to determine the latency measurement periodically—e.g., determine a latency after an operation is executed or after a pre-determined time. For example, the latency measurement component 115 can maintain or determine average latencies, maximum latencies, minimum latencies, or other calculations after an operation associated with a workload is executed. Accordingly, the device 110 can predict current or real-time latencies associated with executing a workload request.

In at least one embodiment, the device 110 can utilize the latency measurements determined by the hardware latency component 115 to synchronize workload requests. For example, digital data source 120 or processing circuitry 132 can include a software component configured to indicate to the transmitter 102 when to initiate a workload request. In some embodiments, the digital data source 120 or processing circuitry 132 can indicate to begin the operation at a time T−L, where "T" is a specified time associated with executing (e.g., transmitting) data associated with the workload descriptor and "L" is the latency measurement determined. In other embodiments, the transmitter 102 can receive a workload request with a specified time "T" and use the determined latency measurement to initiate the operation at time T−L. Additional details of the structure of the transmitter 102 are discussed in more detail below with reference to the figures.

The receiver 104 of devices 110 and 112 may include suitable hardware and/or software for receiving signals, such as data signals from the communication network 108. For example, the receiver 104 may include components for receiving and processing signals to extract the data for storing in a memory, as described in detail below with respect to FIG. 2-FIG. 6.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 1B:
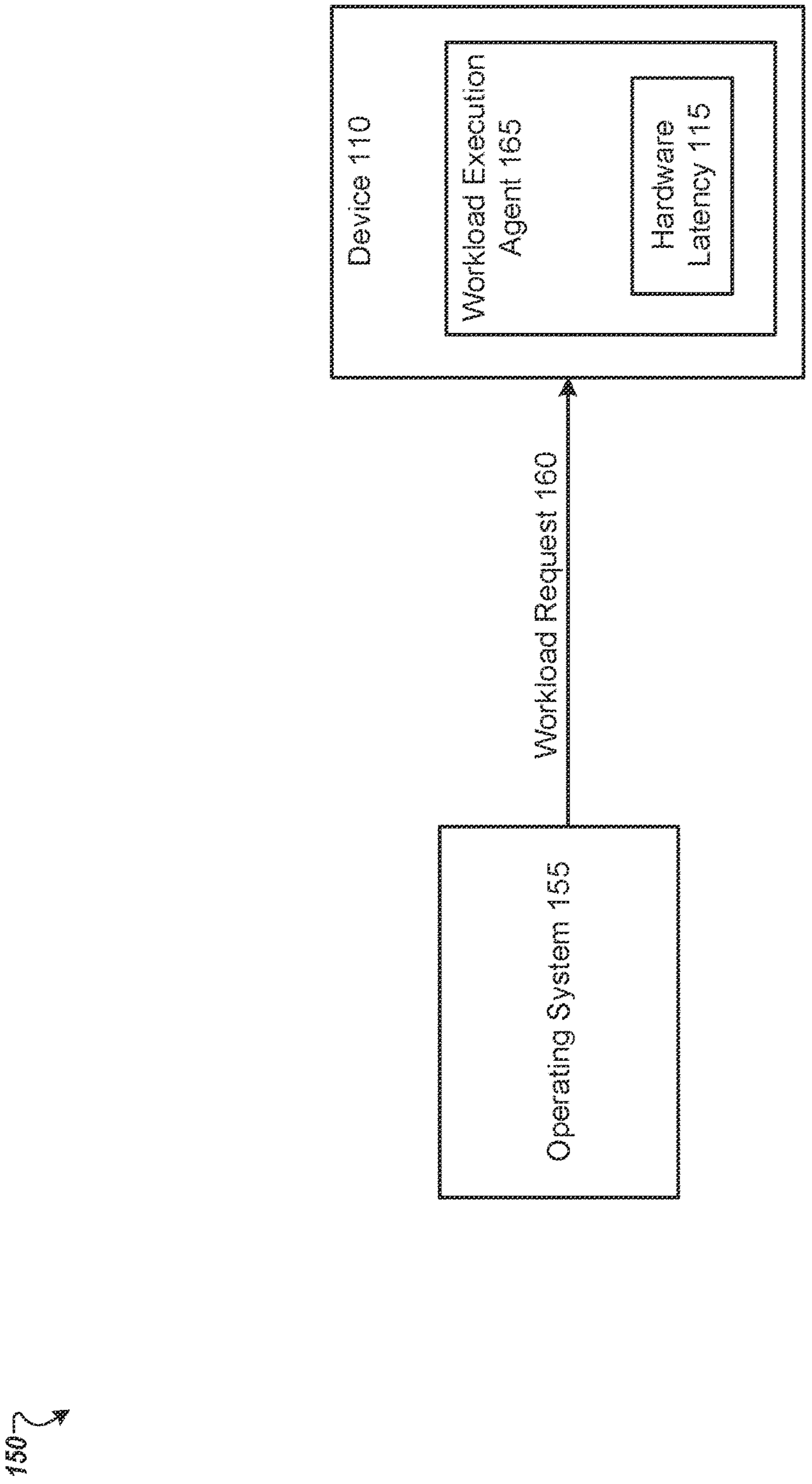
FIG. 1B illustrates an example system according to at least one example embodiment.

FIG. 1B illustrates an example system 150 according to at least one example embodiment. The system 150 can include a device 110 and an operating system 155. In some embodiments, the operating system 155 can be included in the device 110. In some embodiments, the device 110 can include a workload execution agent 165 and hardware latency 115 as described with reference to FIG. 1A.

In at least one embodiment, the operating system 155 is configured to transmit workload request(s) 160 to device 110.

In at least one embodiment, device 110 can include a workload execution agent 165. In at least one embodiment, the device 110 can be an example of a device or system that executes workloads—e.g., the device 110 can be an example of a virtual machine (VM), central processing unit (CPU) or a graphics processing unit (GPU), data processing unit (DPU), etc. In at least one embodiment, the workload execution agent 165 can be an example of a work queue as described with reference to FIGS. 2-7. In at least one embodiment, the workload execution agent 165 can represent workload characteristics. For example, device 110 can be an example of an encryption device or a service—e.g., the device 110 can represent a service engine that is configured to execute workload requests. In some embodiments, the device 110 can receive the workload request 160 and an indication to access the latency measurement and provide the measurement to a software component. In such embodiments, the device 110 can transmit a second time back and the software component can schedule the workload in the work execution agent. In some embodiments, the device 110 can receive an indication to access the latency measurement. In some embodiments, the device 110 (or operating system 155) are configured to receive an indication to perform the latency measurement. In such embodiments, the device 110 can poll the latency measurement and execute the workload at the execution agent 165 accordingly. For example, the device 110 could determine the latency measurement and schedule a workload in response to determining the latency measurement.

As described with reference to FIG. 1A, the hardware latency component 115 is configured to calculate and monitor latencies associated with processing and executing a workload 160. In at least one embodiment, hardware latency component 115 is configured to receive or determine the latencies for packets or chunks of data that exceed a threshold value—e.g., the hardware latency component 115 is configured to determine a latency value for packets larger than the threshold value. By utilizing hardware latency 115, the workload execution agent 165 can execute or consume workloads at a synchronized time.

Figure 2:
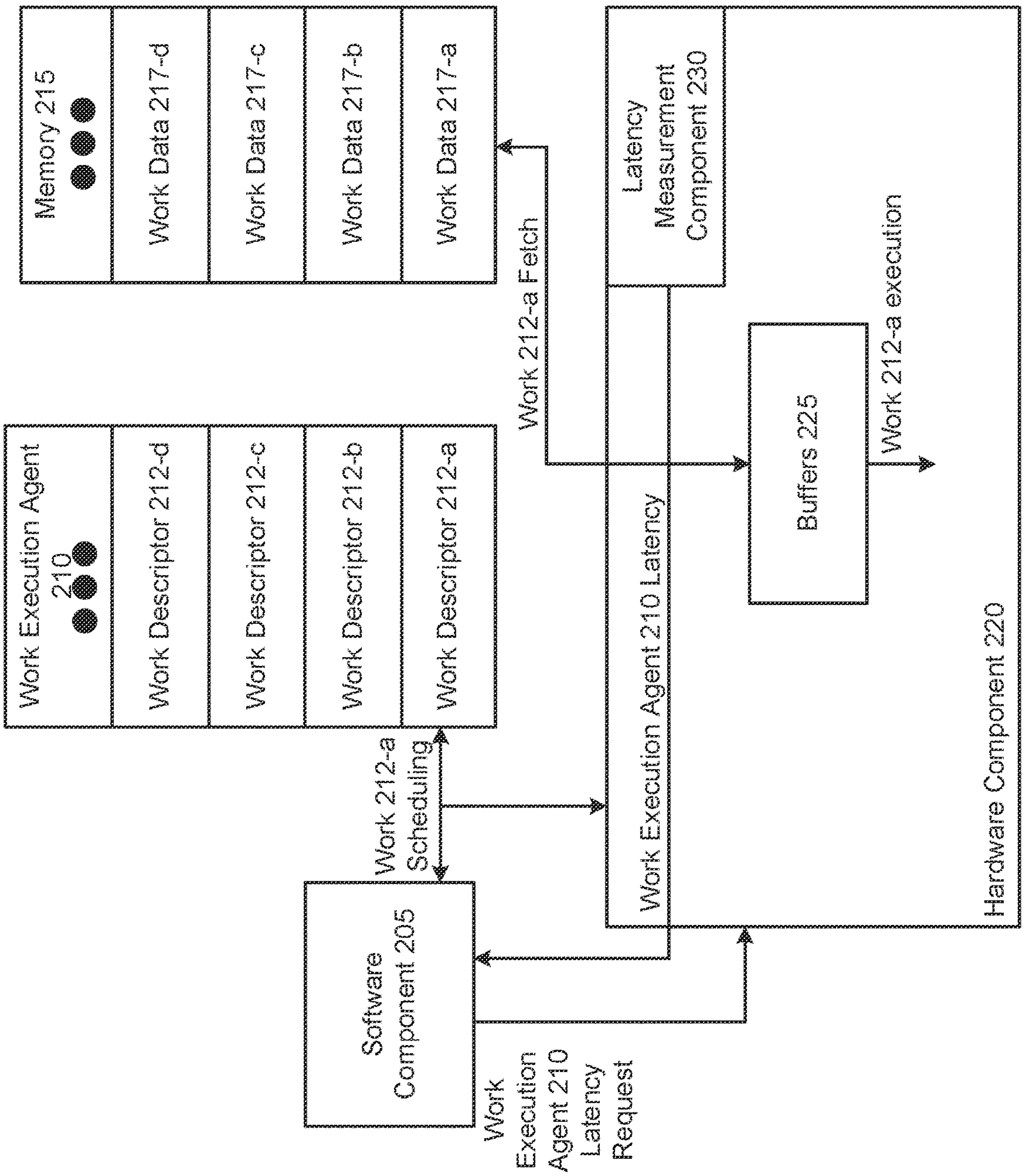
FIG. 2 illustrates an example communication system for scheduling workloads synchronization based on real-time latency measurements, in accordance with at least some embodiments.

FIG. 2 illustrates an example communication system 200 according to at least one example embodiment. The system 200 can be in either device 110 or device 112 as described with reference to FIG. 1A. In some embodiments, portions of system 200 can be located in transmitter 102, receiver 104, digital data source 120, or processing circuitry 132 as described with reference to FIG. 1A. The system 200 can include a software component 205, work queue 210, memory 215, and hardware component 220. In at least one embodiment, the hardware component 220 can include buffers 225 and a latency measurement component 230. In at least one embodiment, system 200 can illustrate an example of the software component 205 using a latency measurement or latency value for workload synchronization.

In at least one embodiment, software component 205 is configured to initiate and schedule operations—e.g., initiate workload execution or initiate data transmission. In some embodiments, the software component 205 can be a set of instructions, data, or programs that operate work queue 210, memory 215, and hardware component 220. In at least one embodiment, the software component 205 is configured to determine a specified time (e.g., a time "T") for executing or transmitting data associated with the workload execution. In some embodiments, the software component 205 can determine the specified time based on network traffic patterns or other requirements associated with an application—e.g., based on requirements of telecommunication or media streaming applications. In at least some embodiments, the software component 205 can include multiple layers—e.g., multiple separate functional components that interact in some sequential way or hierarchical way. For example, the software component 205 can include a user interface that is configured to interact with user inputs provided by a user of the system 200. In such embodiments, the software component 205 can include a hardware latency or workload synchronization interface configured to compensate for latencies. For example, the hardware latency or workload synchronization interface of software component 205 can request latency measurements from hardware component 220 and use the received latency measurement to synchronize workload execution or data transmission as described below. In embodiments where the software component 205 includes the hardware latency or workload synchronization interface, the user interface can be unaware of the latency compensation—e.g., the user interface can indicate the specified time "T" for workload execution and the hardware latency or workload synchronization interface can compensate for latencies and initiate the workload execution before the specified time "T" as described below. In other embodiments, the software component 205 can be without the hardware latency or workload synchronization interface—e.g., the latency compensation can occur in a same layer as the user interface. In at least one embodiment, the software component 205 is configured to post or write (e.g., store) work descriptors 212 to a work queue 210.

In some embodiments, the software component 205 can indicate (e.g., program the hardware component 220 with) a latency measurement or a latency value the hardware component 220 can utilize or determine for latency compensations associated with workload execution. For example, the software component 205 can indicate to use an average latency, a maximum latency, a minimum latency, or any other latency calculation. In at least one embodiment, the software component 205 can indicate the latency measurement or latency value the hardware component 220 can utilize or determine for each different work queue 210, different memory 215, different workload request type (e.g., for each different operation type), etc. That is, the software component 205 can indicate to the hardware component 220 to use a different latency measurement or value for workloads having different characterizations—e.g., different memory 215, different work queue 210, different operation type, etc. In at least one embodiment, the software component 205 can request all latency measurements from the hardware component 220. In such embodiments, the software component 205 can compare the latency measurements and determine which latency measurement to utilize based on the comparison. For example, the software component 205 can request an average latency, a maximum latency, a minimum latency, etc. In such embodiments, the software component 205 can compare the received values and then determine a latency measurement to synchronize the workload or data transmissions accurately.

In at least one embodiment, the work queue 210 is an interface or logical mapping between a workload operation and work data 217. For example, the work queue 210 can store work descriptors 212 associated with a workload request or operation initiated by the software component 205—e.g., the work descriptors 212 can store information regarding the workload request or operation. In some embodiments, the work descriptor 212 can have a pointer or otherwise indicate a location of work data 217 associated with the work descriptor 212-*a*. For example, work descriptor 212-*a* can indicate a workload or operation that involves work data 217-*a* stored at the memory 215. In some embodiments, the work queue 210 can be written to by the software component 205 and read from by hardware component 220—e.g., the software component 205 can use the work queue 210 to indicate workload requests to the hardware component 220. It should be noted that, although (1) work queue 210 is illustrated in system 200, there can be additional work queues 210. For example, the system 200 can include two (2) or more work queues 210, e.g., a plurality of work queues.

In some embodiments, memory 215 is configured to store data. In some embodiments, memory 215 can be an example of a central processing unit (CPU), a graphics processing unit (GPU), or any other type of memory. In at least one embodiment, the memory 215 can be coupled to the hardware component 220 via a link or communication network 108 as described with reference to FIG. 1A. In at least one embodiment, the memory 215 can be coupled with the hardware component 220 via a peripheral component interconnect express (PCIe or PCI-e). It should be noted that although one (1) memory 215 is illustrated in system 200, there can be additional memories 215. For example, the system 200 can include two (2) or more memories 215, e.g., a plurality of memories 215.

In at least one embodiment, hardware component 220 is configured to execute a workload—e.g., transmit data. In some embodiments, the hardware component 220 is an example of a network adapter or a network switch. In at least one embodiment, the hardware component 220 includes buffers 225 and a latency measurement component 230. In some embodiments, the buffers 225 are configured to store data. In at least one embodiment, the hardware component 220 is configured to transmit data stored in the buffers 225. In some embodiments, the hardware component 220 is configured to read the work queue 210. In at least one embodiment, the hardware component 220 is configured to read and copy data from memory 215 for the workload request or operation indicated in the workload descriptor 212.

In at least one embodiment, latency measurement component 230 is configured to calculate or determine real-time latency measurements. In at least one embodiment, the latency measurement component 230 is configured to determine latencies associated with processing and executing a work descriptor 212—e.g., determine latencies that exist between work descriptor 212 being posted to work queue 210 and the work descriptor 212 being executed by the hardware component 220. For example, the latency measurement component 230 can determine latencies associated with hardware utilization—e.g., determine latencies associated with the hardware component 220 having a light workload (e.g., processing relatively small amounts of or no data) versus the hardware component 220 having a heavy workload (e.g., processing relatively large amounts of data or where the buffers 225 are at full capacity). In at least one embodiment, the latency measurement component 230 can determine latencies associated with workload characteristics—e.g., associated with different work queues 210, associated with different types of workloads, or associated with different applications using the workload (e.g., latencies can be different when used by telecommunication systems versus media streaming applications). In some embodiments, the latency measurement component 230 can determine latencies associated with different memory 215 storing the data. For example, the hardware component 220 can be coupled with multiple memory 215, each at various distances from the hardware component 220. Accordingly, there can be different latencies associated with transmitting data to and from a memory region 215. In some embodiments, the latency measurement component 230 can determine latencies associated with a number of work queues 210 handled or processed in parallel—e.g., determine latencies associated with processing one (1) work queue 210 and determine latencies associated with processing two (2) or more work queues 210. In at least one embodiment, the latency measurement component 230 can determine latencies associated with network ports or external connectivity—e.g., determine latencies associated with backed-up network ports or delays in transmitting data due to external connectivity. In at least one embodiment, the latency measurement component 230 can determine latencies associated with cache utilization. Accordingly, the latency measurement component 230 can determine latencies for various different situations and workload requests to enable the software 205 to compensate for latencies and accurately synchronize workloads.

In some embodiments, the latency measurement component 230 is configured to determine an average latency, a maximum latency, a minimum latency, etc. In at least one embodiment, the latency measurement component 230 is configured to determine the latency measurement periodically—e.g., the latency measurement component 230 can determine latency measurements associated with hardware utilization, workload characteristics, memory 215, number of work queues 210 processed in parallel, network port latencies, and/or cache utilization latencies each time a pre-determined time elapses (e.g., after every minute). In other embodiments, the latency measurement component 230 is configured to determine the latency measurement after a workload is executed (e.g., data is transmitted). For example, the hardware component 220 can determine a latency as being a time elapsed from reading the work queue 210 to executing the workload of a previous operation. In at least one embodiment, the latency measurement component 230 can determine the latency measurement by adding or summing all the determined latencies associated with hardware utilization, workload characteristics, memory 215, number of work queues 210 processed in parallel, the network port, and/or cache utilization.

In at least one embodiment, to synchronize workloads, the software component 205 is configured to poll or request a latency associated before initiating a future workload. For example, the software component 205 can periodically poll or request the latency measurement from hardware component 220. In one embodiment, the software component 205 is configured to schedule a workload operation to execute at a specified time "T" at work queue 210. In at least one embodiment, the software component 205 is configured to request a latency associated with work queue 210—e.g., latency measurements associated with hardware utilization, workload characteristics, memory 215, number of work queues 210 processed in parallel, network port latencies, and/or cache utilization corresponding to initiating the operation at work queue 210. In at least one embodiment, the work queue 210 latency request can indicate a type of latency measurement—e.g., maximum, minimum, average, etc. In other embodiments, the software component 205 can program the hardware component 220 when scheduling work at work queue 210.

In at least one embodiment, the hardware component 220 is configured to receive the work queue 210 latency request. In some embodiments, the hardware component 220 is configured to determine the latency measurement requested by the software component 205. For example, the hardware component 220 can determine the latency measurement requested (e.g., maximum, minimum, average, etc.) associated with initiating operations from work queue 210. In some embodiments, the hardware component 220 can transmit the work queue 210 latency to the software component 205.

In at least one embodiment, the software component 205 can receive the work queue 210 latency and compensate for the latency measurement or value 210. For example, the software component 205 can modify the specified time "T" to a time T−L, where "L" is the work queue 210 latency—e.g., the software component 205 can modify the time to the T−L as the hardware component 220 takes the time "L" to process and execute the workload request after it is posted to the work queue 210. In at least one embodiment, the software component 205 can post the workload request to work descriptor 212-*a* at the time T−L—e.g., or otherwise request the hardware component 220 initiate the workload at the time T−L.

In at least one embodiment, the hardware component 220 can read work descriptor 212-*a* when the software component 205 posts the workload. In at least one embodiment, the hardware component 220 initiates the workload operation specified in the work descriptor at the time T−L. In some embodiments, the workload descriptor 212-*a* indicates the associated data is stored at data 217-*a* of the memory 215. In at least one embodiment, the hardware component 220 can read the work descriptor 212-*a* and fetch (e.g., read and copy) work data 217-*a* to the buffers 225. By initiating the operation at time T−L, the hardware component 220 can execute the operation at the specified time "T"—e.g., execute work descriptor 212-*a* at the time T since the hardware component started at time "T" and it took time "L" for the hardware component 220 to read work descriptor 212-*a* and have the work data 217-*a* at the buffers 225.

Figure 3:
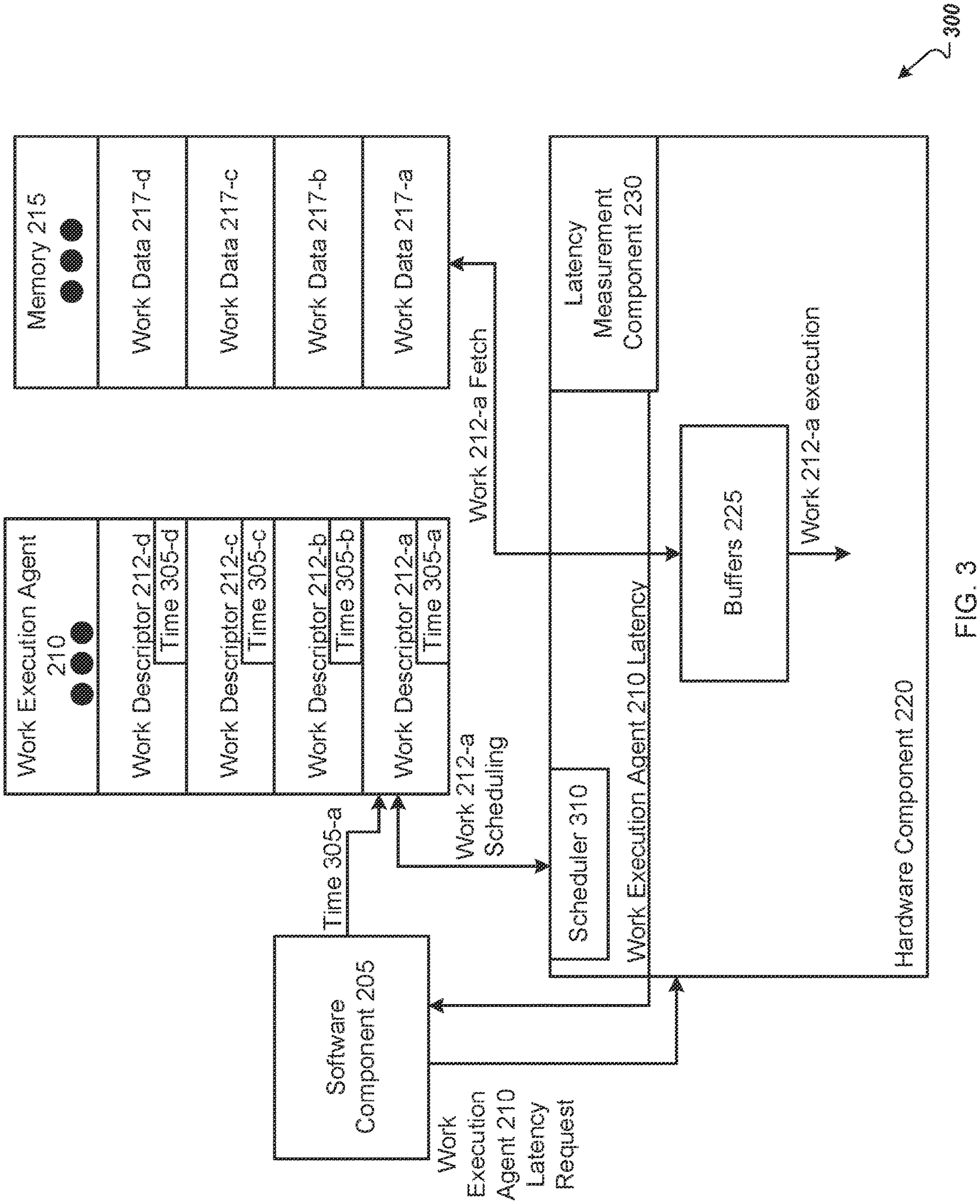
FIG. 3 illustrates an example communication system for scheduling workloads synchronization based on real-time latency measurements, in accordance with at least some embodiments.

FIG. 3 illustrates an example communication system 300 according to at least one example embodiment. In at least one embodiment, the system 300 can be an example of system 200 as described with reference to FIG. 2. For example, the system 300 can include a software component 205, work queue 210, memory 215, and hardware component 220 as described with reference to FIG. 2. In at least one embodiment, the system 300 can include the hardware component 220 with buffers 225 and a latency measurement component 230. In some embodiments, the system 300 can be in either device 110 or device 112, as described with reference to FIG. 1A. In some embodiments, portions of system 300 can be located in transmitter 102, receiver 104, digital data source 120, or processing circuitry 132 as described with reference to FIG. 1A. In at least one embodiment, system 300 can illustrate an example of the software component 205 and hardware component 220 using a latency measurement or latency value for workload synchronization.

In at least some embodiments, system 300 can include a time 305 in work descriptors 212. For example, each work descriptor 212 can be configured to indicate a time to initiate a respective workload operation. In such embodiments, software 205 can be configured to post a workload or workload descriptor 212 to the work queue 210 with the time 305.

In at least some embodiments, the hardware component 220 can include a scheduler 310. In at least one embodiment, the scheduler 310 is configured to read work descriptors 212 from the work queue 210. In at least one embodiment, the scheduler 310 can be configured to schedule a workload operation associated with a respective work descriptor 212 at the time 305—e.g., the scheduler 310 is configured to read the work descriptor 212 to determine the time 305 and initiate the operation at time 305 accordingly.

For example, the software component 205 is configured to poll or request a latency associated before initiating a future workload. For example, the software component 205 can periodically poll or request the latency measurement from hardware component 220. In one embodiment, the software component 205 is configured to schedule a workload operation to execute at a specified time "T" at work queue 210. In at least one embodiment, the software component 205 is configured to request a latency associated with work queue 210—e.g., latency measurements associated with hardware utilization, workload characteristics, memory 215, number of work queues 210 processed in parallel, network port latencies, and/or cache utilization corresponding to initiating the operation at work queue 210. In at least one embodiment, the work queue 210 latency request can indicate a type of latency measurement—e.g., maximum, minimum, average, etc. In other embodiments, the software component 205 can program the hardware component 220 when scheduling work at work queue 210.

In at least one embodiment, the hardware component 220 is configured to receive the work queue 210 latency request. In some embodiments, the hardware component 220 is configured to determine the latency measurement requested by the software component 205. For example, the hardware component 220 can determine the latency measurement requested (e.g., maximum, minimum, average, etc.) associated with initiating operations from work queue 210. In some embodiments, the hardware component 220 can transmit the work queue 210 latency to the software component 205.

In at least one embodiment, software component 205 is configured to receive the work queue 210 latency from the hardware component 220. In such embodiments, the software component 205 can modify the specified time "T" upon receiving the work queue 210 latency. For example, the software component 205 can modify the time "T" by subtracting the latency—e.g., modify the first time "T" to a second time T−L, where "L" is the latency measurement received (e.g., the work queue 210 latency). In at least one embodiment, the software component 205 is configured to post a work descriptor 212-*a* indicating to perform the workload operation. In some embodiments, the software component 205 can include the time 305-*a* in the work descriptor 212-*a*—e.g., indicate to the hardware component 220 to initiate the operation at the time 305-*a* (e.g., T−L).

In at least one embodiment, the scheduler 310 is configured to read the work queue 210. In some embodiments, the scheduler 310 is configured to read the work descriptor 212-*a* and schedule the respective workload operation at the time 305-*a* (e.g., T−L). Accordingly, at the time T−L, the hardware component 220 can initiate the workload operation. In some embodiments, the workload descriptor 212-*a* indicates the associated data is stored at data 217-*a* of the memory 215. In such embodiments, the hardware component 220 can read the work descriptor 212-*a* and fetch (e.g., read and copy) work data 217-*a* to the buffers 225. By initiating the operation at time T−L, the hardware component 220 can execute the operation at the specified time "T"—e.g., execute work descriptor 212-*a* at the time T since the hardware component started at time "T" and it took time "L" for the hardware component 220 to read work descriptor 212-*a* and have the work data 217-*a* at the buffers 225.

Figure 4:
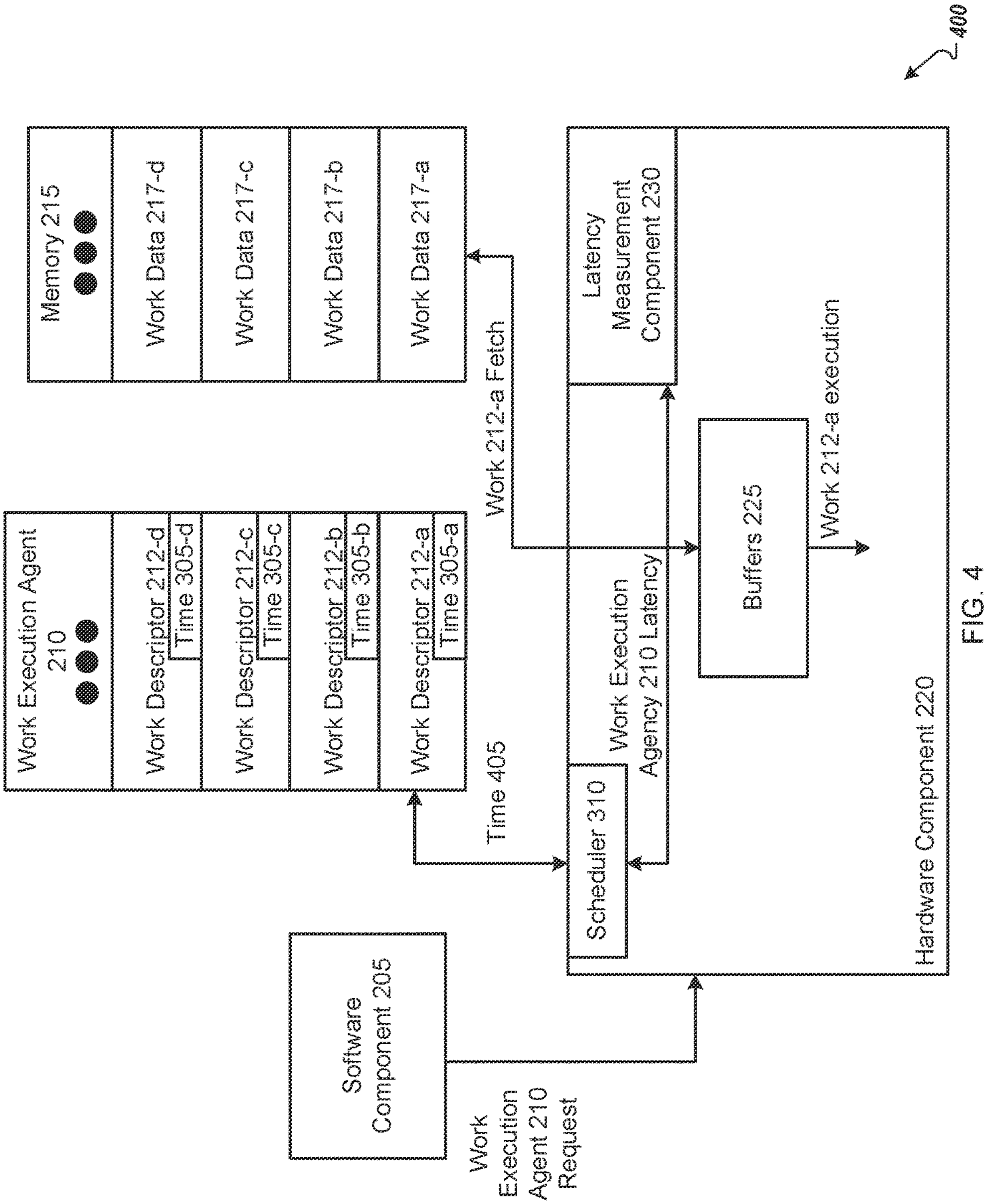
FIG. 4 illustrates an example communication system for scheduling workloads synchronization based on real-time latency measurements, in accordance with at least some embodiments.

FIG. 4 illustrates an example communication system 400 according to at least one example embodiment. In at least one embodiment, the system 400 can be an example of system 200 or 300 as described with reference to FIGS. 2 and 3. For example, the system 400 can include a software component 205, work queue 210, memory 215, and hardware component 220 as described with reference to FIG. 2. In at least one embodiment, the system 400 can include the hardware component 220 with buffers 225 and a latency measurement component 230. In some embodiments, the system 400 can be in either device 110 or device 112, as described with reference to FIG. 1A. In some embodiments, portions of system 400 can be located in transmitter 102, receiver 104, digital data source 120, or processing circuitry 132 as described with reference to FIG. 1A. In at least one embodiment, system 400 can illustrate an example of the hardware component 220 using a latency measurement or latency value for workload synchronization.

In at least some embodiments, system 400 can include a time 305 in work descriptors 212. For example, each work descriptor 212 can be configured to indicate a time to initiate a respective workload operation. In such embodiments, software 205 can be configured to post a workload or workload descriptor 212 to the work queue 210 with the time 305.

In at least some embodiments, the hardware component 220 can include a scheduler 310. In at least one embodiment, the scheduler 310 is configured to read work descriptors 212 from the work queue 210. In at least one embodiment, the scheduler 310 can be configured to schedule a workload operation associated with a respective work descriptor 212 at the time 305—e.g., the scheduler 310 is configured to read the work descriptor 212 to determine the time 305 and initiate the operation at time 305 accordingly. In at least one embodiment, the scheduler 310 is configured to modify a time 305-*a* associated with the work queue 210 responsive to a latency calculation. For example, the scheduler 310 can be configured to determine a latency measurement associated with the work descriptor 212-*a* or work queue 210. In such examples, the scheduler 310 can modify the time 305-*a* to a time 405 based on the latency measurement determined—e.g., modify the time 305-*a* (e.g., a specified time "T") to a time 405 (e.g., T−L).

In one embodiment, the software component 205 can provide the specified time "T" and the latency measurement "L" for the hardware component 220. For example, the software component 205 can poll or request a latency associated before initiating a future workload. In such examples, the software component 205 can periodically poll or request the latency measurement from hardware component 220. In one embodiment, the software component 205 is configured to schedule a workload operation to execute at a specified time "T" at work queue 210. In at least one embodiment, the software component 205 is configured to request a latency associated with work queue 210—e.g., latency measurements associated with hardware utilization, workload characteristics, memory 215, number of work queues 210 processed in parallel, network port latencies, and/or cache utilization corresponding to initiating the operation at work queue 210. In at least one embodiment, the work queue 210 latency request can indicate a type of latency measurement—e.g., maximum, minimum, average, etc. In embodiments where the software component 205 provides the specified time "T" and the latency measurement "L," the hardware component 220 can perform the calculation "T−L."

In other embodiments, the software component 205 can program the hardware component 220 to use a certain type of latency measurement when scheduling work at work queue 210—e.g., the software component 205 can indicate to the hardware component 220 to compensate for a minimum, mean, or maximum latency or a value derived from those metrics (e.g., mean latency multiplied by a predetermined coefficient). In such embodiments, the hardware component 220 can perform the query for the latency measurement. In at least one embodiment, the software component 205 can request the hardware component 220 to determine the latency measurement and perform the latency compensation.

In at least one embodiment, the hardware component 220 is configured to receive the work queue 210 latency request. In some embodiments, the hardware component 220 is configured to determine the latency measurement indicated by the software component 205—e.g., determine a mean, minimum, maximum, median latency value to use as indicated by the software component 205. For example, the hardware component 220 can determine the latency measurement requested (e.g., maximum, minimum, average, etc.) associated with initiating operations from work queue 210. In some embodiments, the latency measurement component 230 can transmit the work queue 210 latency to the scheduler 310.

In at least one embodiment, scheduler 310 is configured to receive the work queue 210 latency from the software component 205. In such embodiments, the scheduler 310 can modify the specified time 305-*a* (e.g., "T") upon receiving the work queue 210 latency. For example, the scheduler 310 can modify the time 305-*a* (e.g., "T") by subtracting the latency—e.g., modify the first time 305-*a* (e.g., "T") to a second time 405 (e.g., T−L, where "L" is the latency measurement received). In at least one embodiment, the scheduler 310 is configured to store or otherwise modify the time 305-*a* to the time 405 at the work descriptor 212-*a*. In other embodiments, the scheduler 310 can schedule to initiate a workload operation associated with work descriptor 212-*a* at the time 405—e.g., the scheduler 310 can ignore the time 305-*a* and use the time 405 instead to compensate for the latencies.

In at least one embodiment, the scheduler 310 is configured to read the work queue 210. In some embodiments, the scheduler 310 is configured to read the work descriptor 212-*a* and schedule the respective workload operation at the time 305-*a* (e.g., T−L). For example, the scheduler 310 can read the time 405 from the work descriptor 212-*a* in embodiments where the scheduler 310 modifies the time 305-*a*. In other embodiments, the scheduler 310 can ignore the time 305-*a* and initiate the workload operation associated with the work descriptor 212-*a* at time 405. In some embodiments, the workload descriptor 212-*a* indicates the associated data is stored at data 217-*a* of the memory 215. In such embodiments, the hardware component 220 can read the work descriptor 212-*a* and fetch (e.g., read and copy) work data 217-*a* to the buffers 225. By initiating the operation at time 405 (e.g., T−L), the hardware component 220 can execute the operation at the specified time 305-*a* (e.g., "T")—e.g., execute work descriptor 212-*a* at the time T since the hardware component started at time "T," and it took time "L" for the hardware component 220 to read work descriptor 212-*a* and have the work data 217-*a* at the buffers 225.

Figure 5:
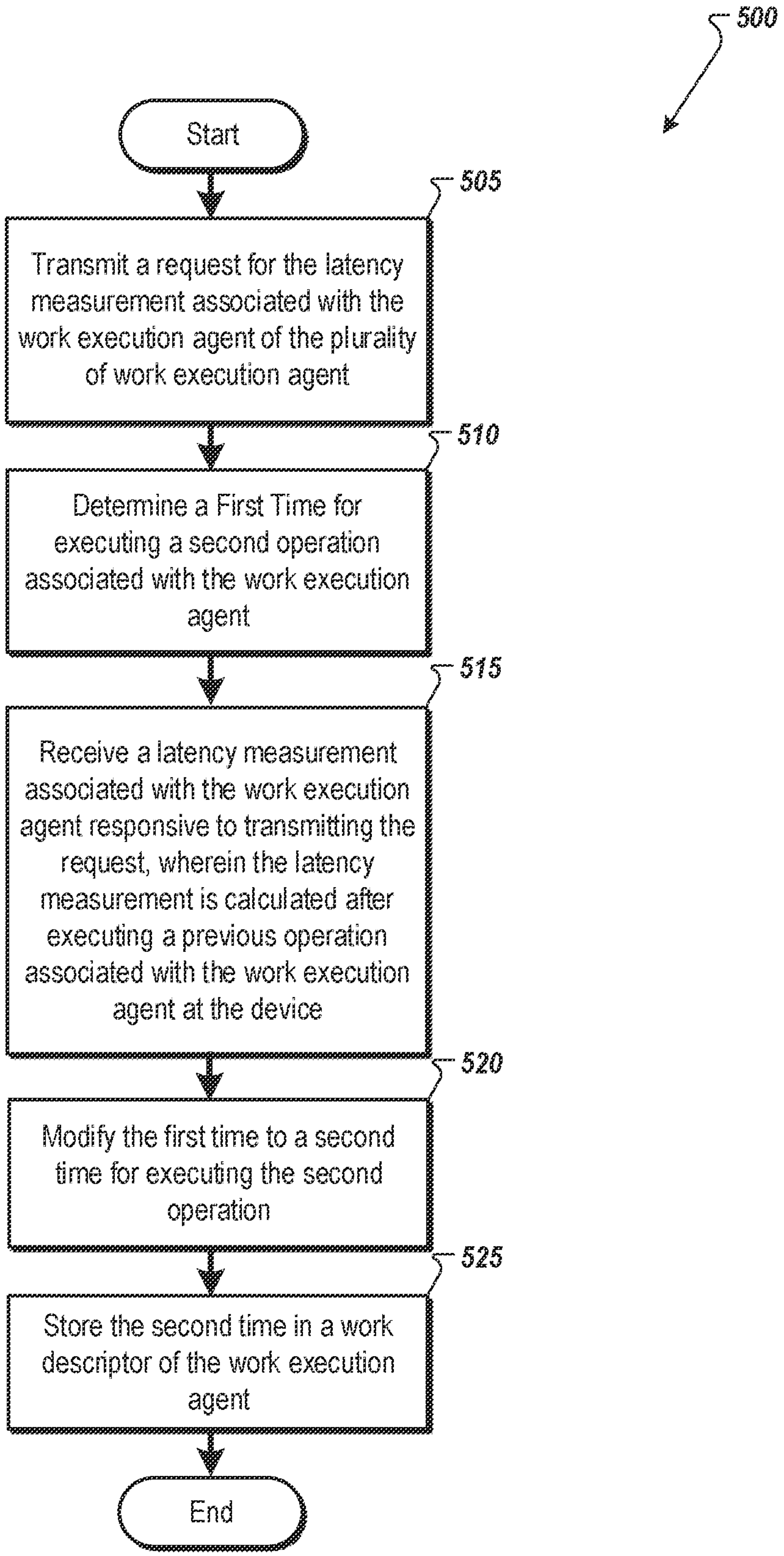
FIG. 5 is a flow diagram of a method for scheduling workloads synchronization based on real-time latency measurements, in accordance with at least some embodiments.

FIG. 5 illustrates a flow diagram of a method 500 for scheduling workload synchronization based on real-time latency measurements. The method 500 can be performed by processing logic comprising hardware, software, firmware, or any combination thereof. In at least one embodiment, the method 500 is performed by software component 205, hardware component 220, work queue 210, and memory 215, as described with reference to FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 505, processing logic can transmit a request for the latency measurement associated with the work queue of the plurality of work queues—e.g., software component 205 polling the hardware component 220 for a latency measurement as described with reference to FIGS. 2-5. In at least one embodiment, the processing logic is a host system, a software component, or a remote node. In at least one embodiment, the latency measurement is at least one of a maximum latency, minimum latency, or average latency associated with the work queue. In some embodiments, the latency measurement is associated with a type of operation or a location of the operation. In at least one embodiment, the latency measurement is associated with hardware utilization, workload characteristics, a memory region, a number of work queues processed in parallel, network port latencies, and/or cache utilization as described with reference to FIG. 2. In at least one embodiment, the latency measurement is associated with two or more memory regions and includes a latency measurement associated with each region (e.g., a maximum average latency associated with each region). In other embodiments, the latency measurement can include a mean, minimum, median, etc. latency associated with each region. For example, accessing a first memory region of the memory array can have a higher latency than accessing a second memory region of the memory array—e.g., accessing a memory region associated with a general processing unit (GPU) can have a different latency than accessing a memory region associated with a central processing unit (CPU). A workload (e.g., work request or operation) can include data from multiple memory regions having the different latencies. Accordingly, the processing device can be instructed by software (e.g., the software component 205) to schedule according to the maximum average (or minimum or median) latency measured for each memory region—e.g., the processing device can modify the first time to the second time responsive to receiving the latency measurement associated with each region. It should be noted, the processing device can determine a latency measurement associated with each unique work execution agent (e.g., with different memory regions) and differentiate between each work execution agent.

At operation 510, processing logic can determine a first time for executing an operation associated with a work queue of a plurality of work queues. For example, the processing logic can determine a specified time (e.g., time "T" as described with reference to FIG. 2). In some embodiments, the first time can be based on a type of workload operation or application—e.g., based on a telecommunications operation or media streaming application. In at least one embodiment, the first time can be based on network traffic—e.g., network traffic patterns or network utilization.

At operation 515, processing logic can receive a latency measurement associated with the work queue responsive to transmitting the request, wherein the latency measurement is calculated after executing a previous operation associated with the work queue at the device—e.g., receive a work queue 210 latency as described with reference to FIG. 2. In some embodiments, the latency measurement is calculated periodically—e.g., each time a predetermined time elapses as described with reference to FIG. 2.

At operation 520, the processing logic can modify the first time to a second time for executing the operation responsive to receiving the latency measurement. In at least one embodiment, to modify the first time to the second time, the processing logic is to determine a difference between the first time and the latency measurement. For example, the processing logic can determine the second time is T–L, where "T" is the first time and "L" is the latency measurement.

At operation 525, the processing logic is to store the second time in a work descriptor of the work queue, the work descriptor corresponding to executing the operation—e.g., store the second time at a work descriptor 212-*a* as described with reference to FIG. 2. In at least one embodiment, the processing logic is to transmit a request to perform the operation at the second time, responsive to modifying the first time to the second time. For example, the processing logic can store the work descriptor in the work queue at the second time. In some embodiments, the processing logic is to execute the operation at the second time responsive to receiving the second request. In at least one embodiment, the processing logic is to read a work descriptor of the work queue. In some embodiments, the processing logic is to schedule to execute the operation at the second time responsive to reading the work descriptor. In some embodiments, the processing logic is to execute the operation at the second time responsive to scheduling the second—e.g., execute the work descriptor at the first time since the hardware component started at the second time, and it took a time associated with the latency measurement for the processing logic to read the work descriptor and have the data at the buffers at the first time.

Figure 6:
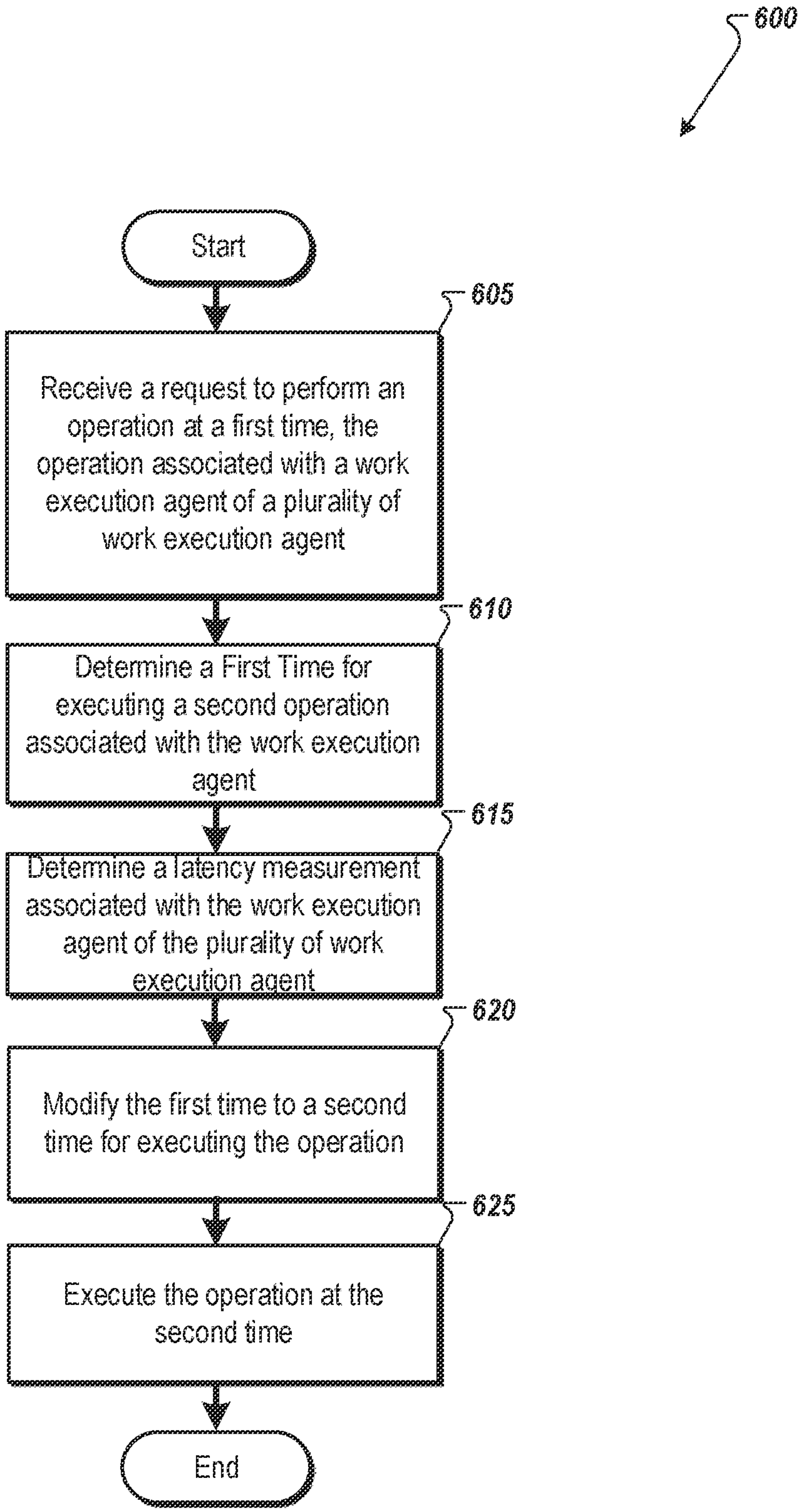
FIG. 6 is a flow diagram for a method for scheduling workloads synchronization based on real-time latency measurements, in accordance with at least some embodiments.

FIG. 6 illustrates a flow diagram of a method 600 for scheduling workload synchronization based on real-time latency measurements. The method 600 can be performed by processing logic comprising hardware, software, firmware, or any combination thereof. In at least one embodiment, the method 600 is performed by software component 205, hardware component 220, work queue 210, and memory 215, as described with reference to FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 605, processing logic receives a request to perform an operation at a first time, the operation being associated with a work queue of a plurality of work queues—e.g., the processing logic can read a work queue and determine a work descriptor indicates to perform the operation at the first time. In at least one embodiment, the processing logic can receive the request from a software component (e.g., software component 205 as described with reference to FIG. 2).

At operation 610, processing logic determines a latency measurement associated with the work queue of the plurality of work queues. In some embodiments, the processing logic can calculate the latency measurement after executing a previous operation associated with the work queue of the plurality work queues. The processing logic can determine the latency measurement based at least in part on calculating the latency measurement. In some embodiments, the processing logic can calculate the latency measurement periodically, as described with reference to FIG. 2. In such embodiments, the processing logic can store the calculated latency measurements and select one of the calculated latency measurements associated with the work queue or work descriptor. In at least one embodiment, the latency measurement is at least one of a maximum latency, minimum latency, or average latency associated with the work queue. In some embodiments, the latency measurement is associated with a type of operation or a location of the operation. In other embodiments, the latency measurement is associated with hardware utilization, workload characteristics, a memory region, a number of work queues processed in parallel, network port latencies, and/or cache utilization as described with reference to FIG. 2.

At operation 620, the processing logic modifies the first time to a second time for executing the operation responsive to determining the latency measurement. In at least one embodiment, to modify the first time to the second time, the processing logic is to determine a difference between the first time and the latency measurement. For example, the processing logic can determine the second time is T–L, where "T" is the first time and "L" is the latency measurement.

At operation 625, the processing logic executes the operation at the second time responsive to modifying the first time to the second time—e.g., execute the work descriptor at the first time since the hardware component started at the second time, and it took a time associated with the latency measurement for the processing logic to read the work descriptor and have the data at the buffers at the first time.

Figure 7:
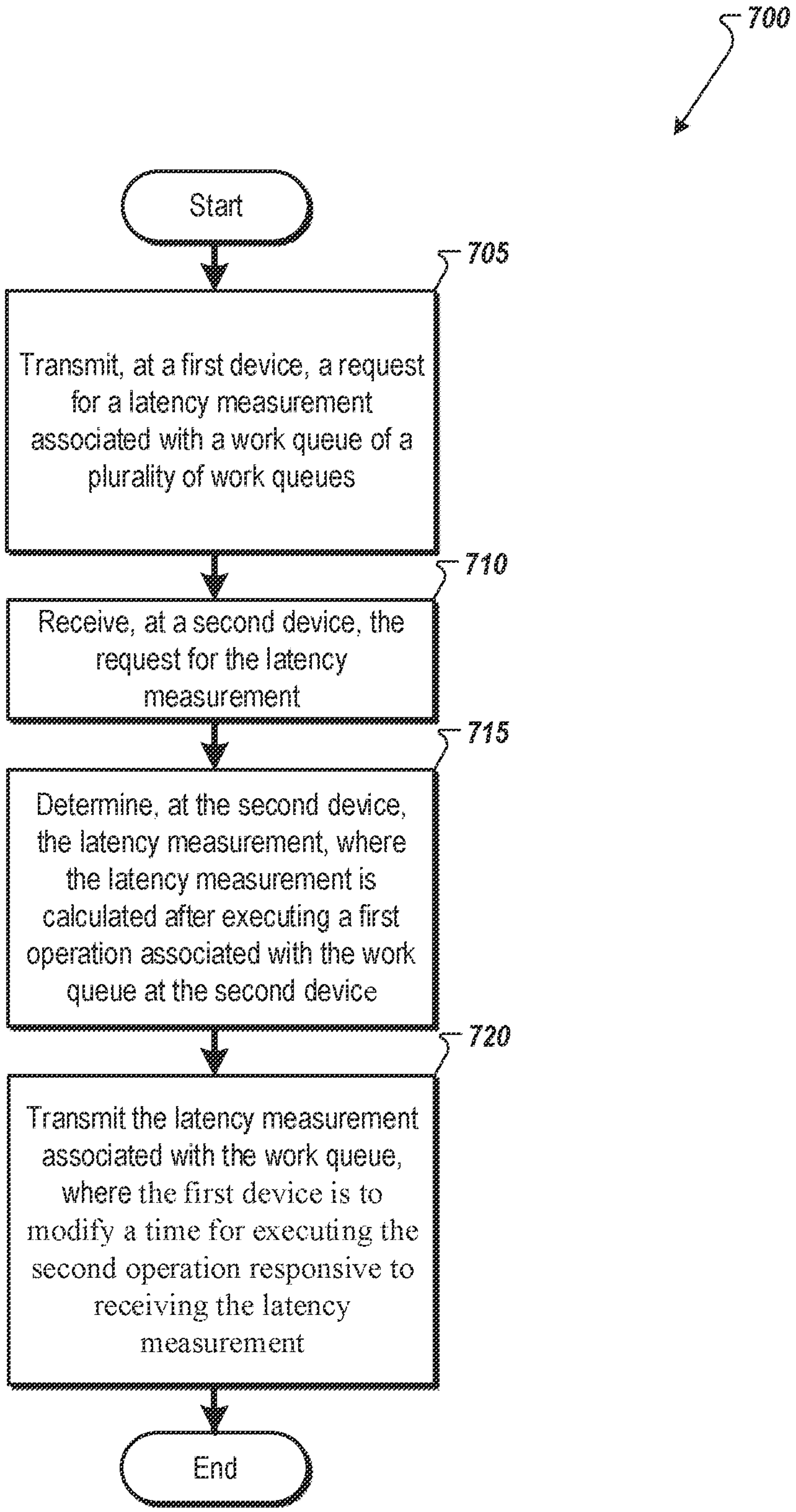
FIG. 7 is a flow diagram for a method of scheduling workloads synchronization based on real-time latency measurements, in accordance with at least some embodiments.

FIG. 7 illustrates a flow diagram of a method 700 for scheduling workload synchronization based on real-time latency measurements. The method 700 can be performed by processing logic comprising hardware, software, firmware, or any combination thereof. In at least one embodiment, the method 700 is performed by software component 205, hardware component 220, work queue 210, and memory 215, as described with reference to FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 705, processing logic of a first device coupled to a link transmits a request for a latency measurement associated with a work queue of a plurality of work queues. In at least one embodiment, the first device is a software component—e.g., software component 205 as described with reference to FIG. 2. In some embodiments, the processing logic of the first device can periodically transmit requests for the latency measurement.

At operation 710, processing logic of a second device coupled to the link receives the request for the latency measurement.

At operation 715, processing logic of the second device determines the latency measurement. The latency measurement is calculated after executing a first operation associated with the work queue at the second device. In at least one embodiment, the latency measurement is at least one of a maximum latency, minimum latency, or average latency associated with the work queue. In other embodiments, the latency measurement is associated with hardware utilization, workload characteristics, a memory region, a number of work queues processed in parallel, network port latencies, and/or cache utilization as described with reference to FIG. 2. In at least one embodiment, the processing logic can determine a plurality of latency measurements, each associated with a different work queue, memory region, hardware utilization, number of work queues processed in parallel, different network port latency, or different cache utilization.

At operation 720, the processing logic of the second device transmits the latency measurement associated with the work queue responsive to determining the latency measurement, wherein the first device is to modify a time for executing the second operation responsive to receiving the latency measurement. For example, the processing logic can determine the second time is T−L, where "T" is the first time and "L" is the latency measurement.

In some embodiments, the processing logic of the first device stores the modified time in a work descriptor of the work queue, the work descriptor corresponding to executing the second operation.

In at least one embodiment, the processing logic of the second device reads the work descriptor of the work queue. In such embodiments, the processing logic of the second device initiates the second operation at the modified time responsive to reading the work descriptor. In some embodiments, the processing logic of the second device executes the second operation at the modified time responsive to initiating the second operation at the modified time e.g., execute the work descriptor at the first time since the hardware component started at the second time, and it took a time associated with the latency measurement for the processing logic to read the work descriptor and have the data at the buffers at the first time.

Figure 8:
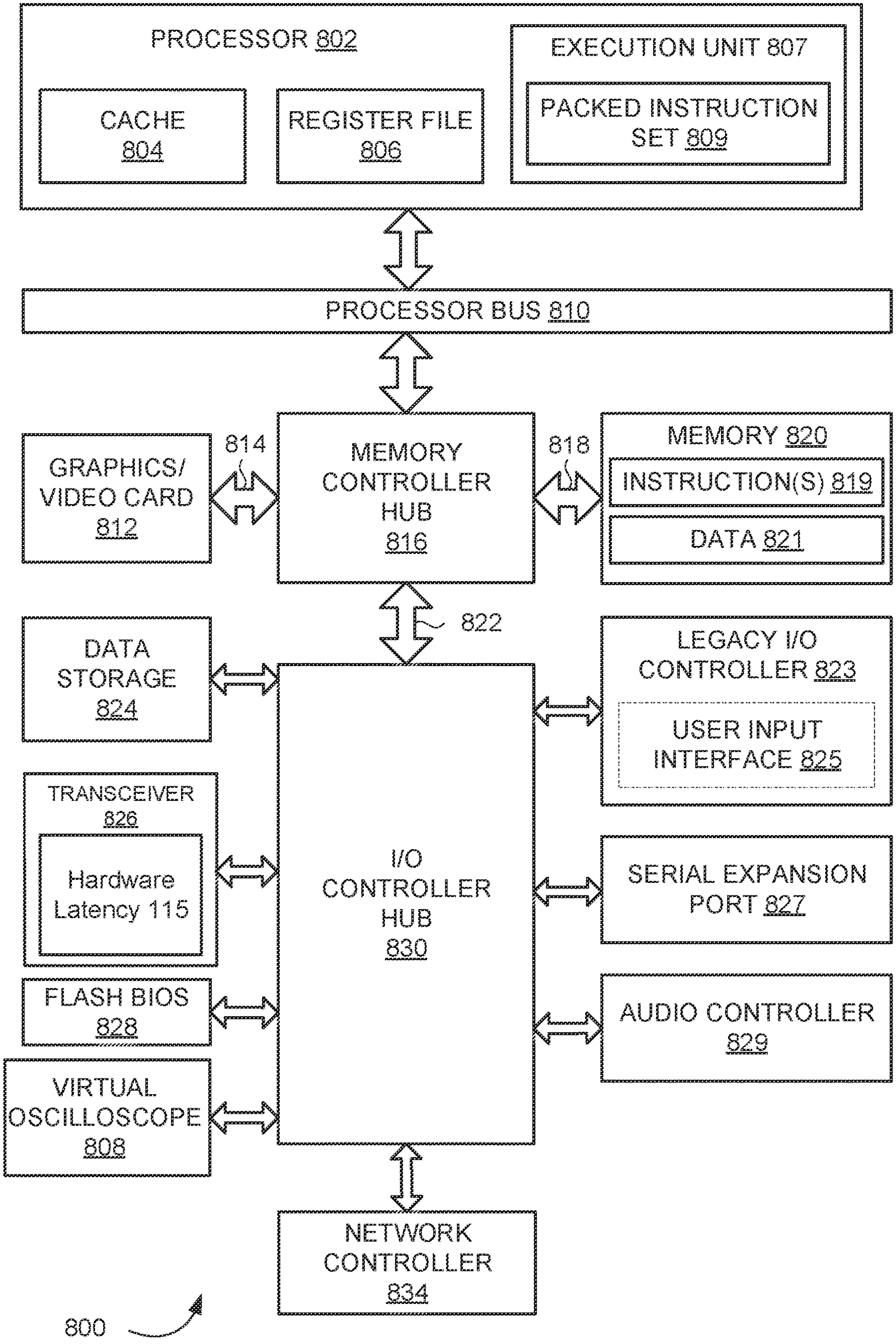
FIG. 8 illustrates an example computer system including a transceiver including a chip-to-chip interconnect, in accordance with at least some embodiments.

FIG. 8 illustrates a computer system 800 in accordance with at least one embodiment. In at least one embodiment, computer system 800 may be a system with interconnected devices and components, an SOC, or some combination. In at least one embodiment, computer system 800 is formed with a processor 802 that may include execution units to execute an instruction. In at least one embodiment, computer system 800 may include, without limitation, a component, such as processor 802, to employ execution units including logic to perform algorithms for processing data. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 800 may be used in devices such as graphics processing units (GPUs), network adapters, central processing units and network devices, such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 800 may include, without limitation, processor 802 that may include, without limitation, one or more execution units 807 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 800 is a single processor desktop or server system. In at least one embodiment, computer system 800 may be a multiprocessor system. In at least one embodiment, processor 802 may include, without limitation, a CISC microprocessor, a RISC microprocessor, a VLIW microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. In at least one embodiment, processor 802 may also include a combination of both internal and external caches. In at least one embodiment, a register file 806 may store different types of data in various registers including, without limitation, integer registers, floating point registers, status registers, and instruction pointer register.

In at least one embodiment, execution unit 807, including, without limitation, logic to perform integer and floating point operations, also resides in processor 802. Processor 802 may also include a microcode ("ucode") read only memory ("ROM") that stores microcode for certain macro instructions. In at least one embodiment, execution unit 807 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 800 may include, without limitation, a memory 820. In at least one embodiment, memory 820 may be implemented as a DRAM device, an SRAM device, flash memory device, or other memory device. Memory 820 may store instruction(s) 819 and/or data 821 represented by data signals that may be executed by processor 802.

In at least one embodiment, a system logic chip may be coupled to processor bus 810 and memory 820. In at least one embodiment, the system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through high bandwidth memory path 818, and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a transceiver 826, a data storage 824, a legacy I/O controller 823 containing a user input interface 825 and a keyboard interface, a serial expansion port 827, such as a USB, and a network controller 834. Data storage 824 may comprise a hard disk drive, a floppy disk drive, a CD-ROM device, a flash memory device, or other mass storage device. In an embodiment, the transceiver 826 includes a constrained FFE 808.

In at least one embodiment, FIG. 8 illustrates a system, which includes interconnected hardware devices or "chips" in a transceiver 826—e.g., the transceiver 826 includes a chip-to-chip interconnect including the first device 110 and second device 112 as described with reference to FIG. 1A). In at least one embodiment, FIG. 8 may illustrate an exemplary SoC. In at least one embodiment, devices illustrated in FIG. 8 may be interconnected with proprietary interconnects, standardized interconnects (e.g., PCIe), or some combination thereof and utilize a GRS link. In at least one embodiment, one or more components of system 800 are interconnected using compute express link ("CXL") interconnects. In an embodiment, the transceiver 826 can include a hardware latency component 115 as described with reference to FIG. 1A. In such embodiments, the hardware latency component 115 can be configured to determine latencies associated with processing and transmitting data associated with a respective workload. In at least one embodiment, the transceiver 826 can utilize the determined latencies to adjust a time to initiate the respective workload, as described with reference to FIGS. 2-7.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in the appended claims.

Use of the terms "a" and "an" and "the" and similar referents in the context of describing disclosed embodiments (especially in the context of the following claims) are to be construed to cover both singular and plural, unless otherwise indicated herein or clearly contradicted by context, and not as a definition of a term. The terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A device comprising:

a processing device, coupled to a work execution agent, the processing device configured to:

determine a first time for executing an operation associated with the work execution agent;

receive a latency measurement associated with the work execution agent, wherein the latency measurement is calculated based on executing a previous operation associated with the work execution agent at the device; and modify the first time to a second time for executing the operation based on the latency measurement, wherein the first time is modified to the second time by subtracting the latency measurement from the first time to compensate for a latency of executing the operation, and wherein modifying the first time to the second time causes the work execution agent to execute the operation at the second time.

2. The device of claim 1, wherein the processing device is to:

store the second time in a work descriptor of the work execution agent, the work descriptor corresponding to executing the operation.

3. The device of claim 1, wherein the processing device is to:

transmit a request for the latency measurement associated with the work execution agent.

4. The device of claim 1, wherein the processing device is a host system, a software component, or a remote node.

5. The device of claim 1, wherein the processing device is to:

transmit a request to perform the operation at the second time responsive to modifying the first time to the second time.

6. The device of claim 1, wherein the device is to:

read a work descriptor of the work execution agent;

schedule to execute the operation at the second time responsive to reading the work descriptor; and execute the operation at the second time responsive to scheduling the operation.

7. The device of claim 1, wherein the latency measurement is at least one of a maximum latency, minimum latency, or average latency associated with the work execution agent.

8. The device of claim 1, wherein the latency measurement is associated with a type of operation or a location of the operation.

9. The device of claim 1, wherein the latency measurement is associated with two or more memory regions and includes the latency measurement associated with each region, and wherein the processing device is to modify from the first time to the second time responsive to receiving the latency measurement associated with each region.

10. A network device comprising:

a transmitter coupled to a processing device, the transmitter to:

receive a request to perform an operation at a first time, the operation associated with a work execution agent of a plurality of work execution agents;

determine a latency measurement associated with the work execution agent of the plurality of work execution agents, wherein the latency measurement is calculated based on executing a previous operation associated with the work execution agent;

modify the first time to a second time for executing the operation responsive to determining the latency measurement, wherein the first time is modified to the second time by subtracting the latency measurement from the first time to compensate for a latency of executing the operation; and execute the operation at the second time responsive to modifying the first time to the second time.

11. The network device of claim 10, wherein the transmitter is to:

calculate the latency measurement after executing a previous operation associated with the work execution agent of the plurality of work execution agents, wherein the transmitter is to determine the latency measurement based at least in part on calculating the latency measurement.

12. The network device of claim 10, wherein to modify the first time to the second time, the transmitter is to:

determine a difference between the first time and the latency measurement.

13. The network device of claim 10, wherein the latency measurement is at least one of a maximum latency, minimum latency, or average latency associated with the work execution agent.

14. The network device of claim 10, wherein the latency measurement is associated with a type of operation or a location of the operation.

15. A system comprising:

a first device coupled to a link, the first device to:

transmit a request for a latency measurement associated with a work execution agent of a plurality of work execution agents; and a second device coupled to the link, the second device to:

receive the request for the latency measurement;

determine the latency measurement, wherein the latency measurement is calculated based on executing a first operation associated with the work execution agent at the second device; and transmit the latency measurement associated with the work execution agent responsive to determining the latency measurement, wherein the first device is to modify a time for executing a second operation responsive to receiving the latency measurement, wherein the modified time is determined by subtracting the latency measurement from an original time for executing the second operation to compensate for a latency of executing the second operation.

16. The system of claim 15, wherein the first device is to:

store the modified time in a work descriptor of the work execution agent, the work descriptor corresponding to executing the second operation.

17. The system of claim 16, wherein the second device is to:

read the work descriptor of the work execution agent; and initiate the second operation at the modified time responsive to reading the work descriptor.

18. The system of claim 17, wherein the second device is to:

execute the second operation at the modified time responsive to initiating the second operation at the modified time.

* * * * *